(12) United States Patent
Zenzen

(10) Patent No.: US 6,345,700 B1
(45) Date of Patent: Feb. 12, 2002

(54) ELECTRIC WARNING DEVICE FOR INDICATING FRICTION LINING WEAR AS WELL AS BRAKE LINING MODULE EQUIPPED THEREWITH AND DISK BRAKE

(75) Inventor: Guido Zenzen, Macken (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/713,577

(22) Filed: Nov. 15, 2000

Related U.S. Application Data

(63) Continuation of application No. PCT/EP99/03526, filed on May 21, 1999.

(30) Foreign Application Priority Data

May 22, 1998 (DE) .......................................... 198 23 022

(51) Int. Cl.⁷ ............................................... F16D 66/02
(52) U.S. Cl. .............................. 188/1.11 L; 188/1.11 E
(58) Field of Search ....................... 188/1.11 L, 1.11 W, 188/1.11 E; 340/454

(56) References Cited

U.S. PATENT DOCUMENTS

| | | | |
|---|---|---|---|
| 4,677,420 A | 6/1987 | Topic et al. | |
| 4,832,160 A | 5/1989 | Fargier et al. | |
| 5,103,939 A | 4/1992 | Schroeter | |

FOREIGN PATENT DOCUMENTS

| | | | |
|---|---|---|---|
| DE | 2535265 | | 2/1977 |
| DE | 3307394 C2 | | 9/1983 |
| DE | 297215 | | 8/1990 |
| DE | 4301129 C1 | | 11/1993 |
| DE | 4237679 | | 5/1994 |
| EP | 190705 B1 | | 8/1986 |
| EP | 475335 B1 | | 11/1993 |
| EP | 412541 B1 | | 1/1994 |
| EP | 634586 | | 1/1995 |
| FR | 2617257 | | 12/1988 |
| GB | 2115893 | * | 9/1983 |

* cited by examiner

*Primary Examiner*—Christopher P. Schwartz
(74) *Attorney, Agent, or Firm*—MacMillan, Sobanski & Todd, LLC

(57) ABSTRACT

A brake lining module (10) with electric warning device (12) for indicating excessive friction lining wear comprises a back plate (14), to which a friction lining (16) is fastened, wherein the back plate (14) has a radially situated, friction-lining-free region (18). Disposed close to the back plate (14) in the friction lining (16) is a bore (24), in which a plug (28) is provided, which comprises a head (34) and a shank (32) with a longitudinal groove (38), in which an electric conductor (30) passed through the head (34) is accommodated. Projecting up from the head (34) of the plug (28) is a protective shield (36), which is laterally offset relative to the longitudinal groove (38) and has an extension (46), which at a distance above the head (34) protrudes in the direction of the common center plane (40) of the shank (32) and of the longitudinal groove (38). To reduce the overall radial height and prevent damage to the electric conductor (30), the back plate (14) in the friction-lining-free region (18) has a recess (48) open towards its radial edge and the extension (46) extends from the protective shield (36) over the common center plane (40) of the shank (32) and of the longitudinal groove (38) up to at least approximately the opposite edge of the shank (32). The recess (48) and the bore (24) have center planes which are at least adjacent.

16 Claims, 6 Drawing Sheets

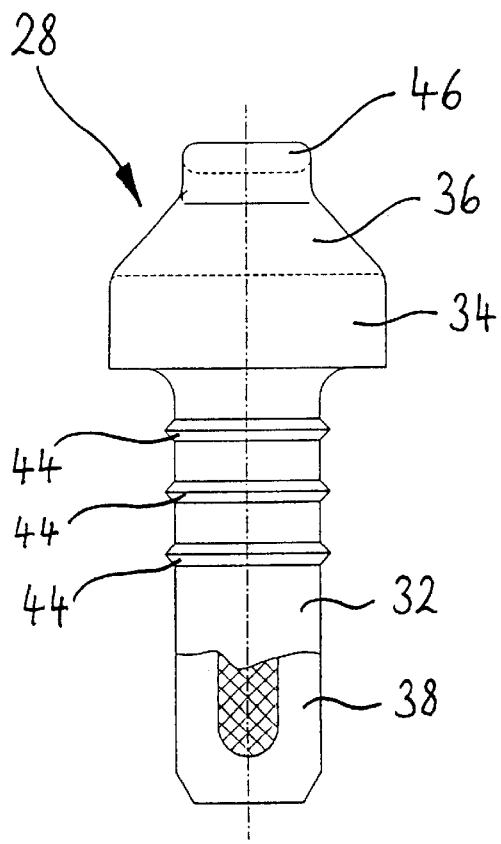
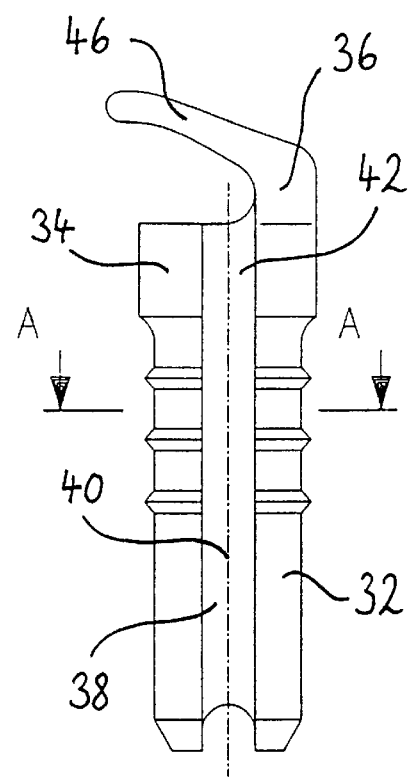
Fig. 4A
Fig. 4B
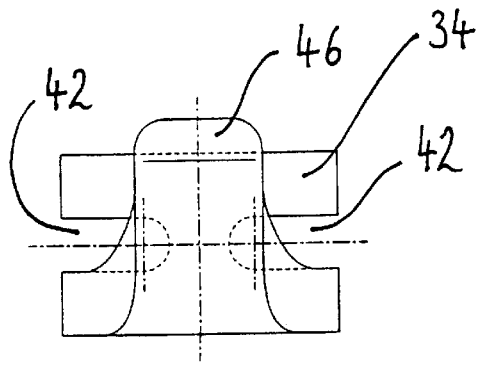
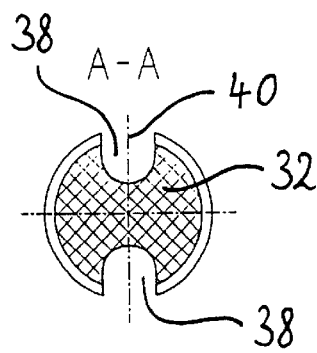
Fig. 4C
Fig. 4D

ELECTRIC WARNING DEVICE FOR INDICATING FRICTION LINING WEAR AS WELL AS BRAKE LINING MODULE EQUIPPED THEREWITH AND DISK BRAKE

This application is a continuation of PCT/EP99/03826 filed May 21, 1999.

BACKGROUND OF THE INVENTION

The invention relates to an electric warning device according to the preamble of claim 1, a brake lining module equipped therewith and a disk brake equipped with such a brake lining module.

An electric warning device having the features of the preamble of claim 1 is known from German patent 33 07 394 (DE 33 07 394 C2). The electric warning device for indicating worn friction linings substantially comprises a plug with a head and a shank, which has a longitudinal groove for receiving an electric conductor. The electric conductor is usually inserted as a U-shaped loop into the longitudinal groove of the plug and fastened by means of the plug to the brake lining. To the end, the brake lining in the friction lining material has a mostly radially extending bore, into which the plug is inserted and fixed in position by a clamping or spreading action or alternatively by sealing with an adhesive (synthetic resin or the like).

The electric conductor itself is generally a litz wire with an insulating wrapper. The conductor is connected to an electric circuit which closes when, as a result of advanced friction lining wear, the brake disk has ground through the plug and the insulating wrapper of the conductor and is touching the conductor. When the conductor is fashioned in the shape of a loop, it may form a constituent part of a so-called break circuit which is interrupted when, as friction lining wear progresses further, the conductor is fully severed.

In the brake lining module known from DE 33 07 394 C2 the electric conductor, before it reaches the head of the plug, is passed through a tubular rivet which is used to support a brake lining hold-down spring pivotally on a projection of the back plate of the brake lining. The hold-down spring is supported on the bridge of a floating caliper of a floating-caliper disk brake. The arrangement prevents the electric conductor from becoming nipped between the hold-down spring and the back plate of the brake lining. However, such a style of construction calls for a radial gap of approximately 10 mm between the radially outer edge of the brake lining and the vehicle wheel rim, with which the brake cooperates.

In heavy-duty disk brakes the brake disk is to have as large a diameter as possible in order to be able to achieve a sufficiently high braking torque for fast and heavy vehicles and hence also reduce the load per unit area of the so-called brake disk path and at the same time obtain a larger heat-dissipating surface. The brake disk path is the annular surface where, during braking, the friction linings are supported against the brake disk. Frequently the brake disk diameter is to be increased without increasing the diameter of the wheel rim. This may be achieved only by utilizing the clearance between the wheel rim and the brake disk as far as is constructionally possible. The smaller the clearance still remaining between the wheel rim and the brake disk is, the greater the risk of damage to the electric conductor, e.g. as a result of its being nipped between two components.

SUMMARY OF THE INVENTION

The object of the invention is to provide an electric warning device for indicating excessive friction lining wear and a brake lining module equipped therewith, which takes up less radial installation space than was previously customary and yet reliably prevents damage to the electric conductor. In particular, nipping of the electric conductor between the back plate of the brake lining and a hold-down spring is to be avoided.

The object is achieved according to the invention by an electric warning device having the features indicated in claim 1. Accordingly, the extension provided on the plug extends from the protective shield over the joint centre plane of the plug shank and of the longitudinal groove, in which the conductor is accommodated, up to, say, at least the opposite plug shank edge so that the electric conductor is forced by the extension into a direction deflected through approximately 90 degrees. According to the invention, therefore, the electric conductor of the electric warning device is led away in a manner that takes up only a small amount of radial installation space and is moreover well protected. The plug fastening the electric conductor in the friction lining may be provided radially at the inside or radially at the outside of the brake lining.

In accordance with an advantageous development of the electric warning device according to the invention, the extension extends not only up to, say, at least the opposite plug shank edge but even beyond the edge of the head of the plug shank. By the means, even more reliable guidance of the electric conductor in the desired direction is achieved.

In many embodiments of the electric warning device according to the invention, the extension extending from the protective shield is of a resiliently compliant design such that it may exert a force acting in the direction of the plug shank upon the electric conductor. The effect thereby achieved is that the conductor in the region of the warning device is led away in as flat a manner as possible even when the conductor at its further extension is acted upon by forces attempting to pull it in another direction. In other embodiments, the extension is rigid and stable enough to retain its preset orientation to an adequate extent even when forces act upon it.

The invention also relates to a brake lining module which is equipped with an electric warning device of the previously described type. In the brake lining module according to the invention, the back plate of the brake lining in a radially situated, friction-lining-free region is provided with a recess, which is open towards the radial edge of the back plate and through which the electric conductor is passed. The extension of the warning device according to the invention forces the conductor into the recess of the back plate. The recess of the brake lining back plate and the bore in the friction lining material, in which the plug of the warning device is fastened, have centre planes which are mutually adjacent in order that the conductor may be led as quickly as possible out of the most temperature-stressed region close to the brake disk. Preferably, the recess of the brake lining back plate and the bore in the friction lining material have a common centre plane.

In embodiments of the brake lining module according to the invention with a resilient extension, the latter exerts a force pressing the electric conductor back into the recess if for some reason the electric conductor has a tendency to leave the recess of the back plate.

In accordance with an advantageous development of the brake lining module according to the invention, the extension of the warning device extends as far as into the recess of the back plate. The electric conductor is therefore held even more reliably in the recess of the back plate and the risk of pinching of the conductor between the edge of the brake lining back plate and a hold-down spring is further reduced.

The present invention also relates to a disk brake, in particular a vehicle disk brake, which is equipped with a brake lining module according to the invention. Such a disk brake, for example a floating-frame disk brake, may utilize the clearance between it and a wheel rim to the maximum extent.

In a preferred embodiment of the disk brake, a spring arm of a hold-down spring acting upon the brake lining module closes the radially open edge of the recess of the brake lining back plate, through which the electric conductor is guided. In the manner the electric warning device with its conductor is still held in the friction lining even if the adhesive, which is supposed to secure the plug in the bore of the friction lining, has decomposed for example as a result of excessive heat.

BRIEF DESCRIPTION OF THE DRAWINGS

There now follows a detailed description of several preferred embodiments of a warning device according to the invention with reference to the accompanying, partially diagrammatic drawings. The drawings show.

DETAILED DESCRIPTION OF THE PREFERRED EMBODIMENT

Figure 1:
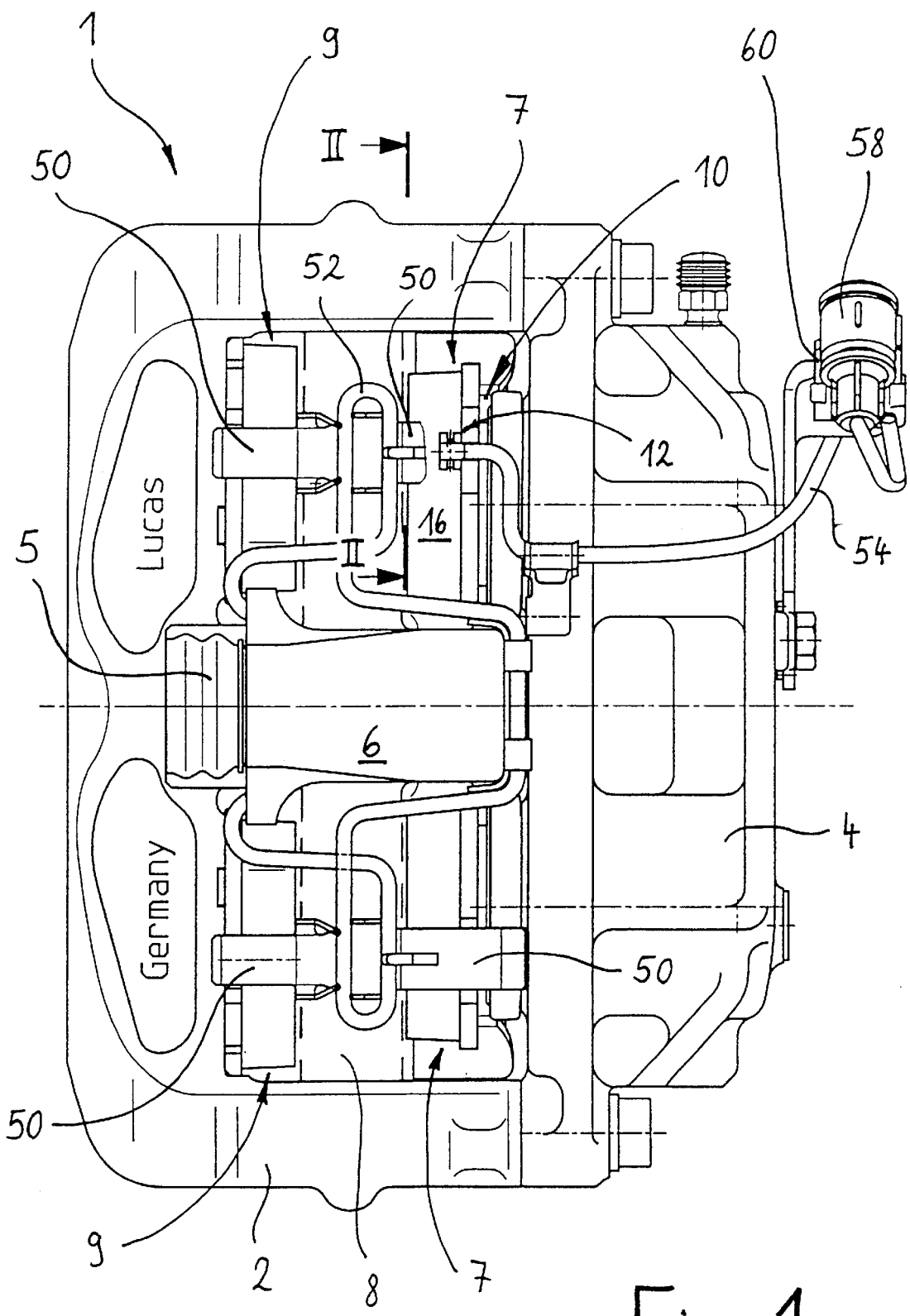
FIG. 1 a plan view of a floating-frame disk brake with a brake lining module according to the invention in accordance with a first embodiment, FIG. 2 the view II—II from FIG. 1, FIG. 3 the section III—III from FIG. 2, FIG. 4A a front part-sectional view of a plug of the electric warning device according to the invention for indicating friction lining wear, FIG. 4B a side view of the plug of FIG. 4A, FIG. 4C the section A—A from FIG. 4B, FIG. 4D the plan view of the plug of FIG. 4A, FIG. 5 a ready-for-connection brake lining module according to the invention, FIG. 6 a slightly modified embodiment of a brake lining module with a warning device according to the invention, fitted into another vehicle disk brake, and FIG. 7 a, once more, modified embodiment of a brake lining module with a warning device according to the invention, fitted into a vehicle disk brake of yet another design.

FIG. 1 shows a hydraulically operable floating-frame disk brake 1 for a motor vehicle.

The disk brake 1 has a floating frame 2, which is connected to a housing 4 accommodating two hydraulic actuating pistons 3 (see FIG. 3) and is guided by means of sealed guide pins 5 so as to be slidingly displaceable on a brake carrier 6.

By means of the hydraulic actuating pistons 3 inner brake linings 7 may be pressed against a brake disk 8. As soon as the brake linings 7 abut the brake disk 8, the hydraulic actuating forces act via the floating frame 2 also upon outer brake linings 9 so that the latter are likewise pressed against the brake disk 8 and together with the inner brake linings 7 brake a vehicle wheel, which is not shown here. The structure and the basic function of such a disk brake are well known to experts in the present field and therefore require no further explanation. Reference is made in connection to European patent specification EP 0 412 541, for example.

The disk brake 1 shown in FIG. 1 comprises a brake lining module generally denoted by 10, which is provided with an electric warning device 12 for indicating worn friction linings. The brake lining module 10 is now described in detail with reference in particular to FIGS. 2 to 4.

Figure 2:
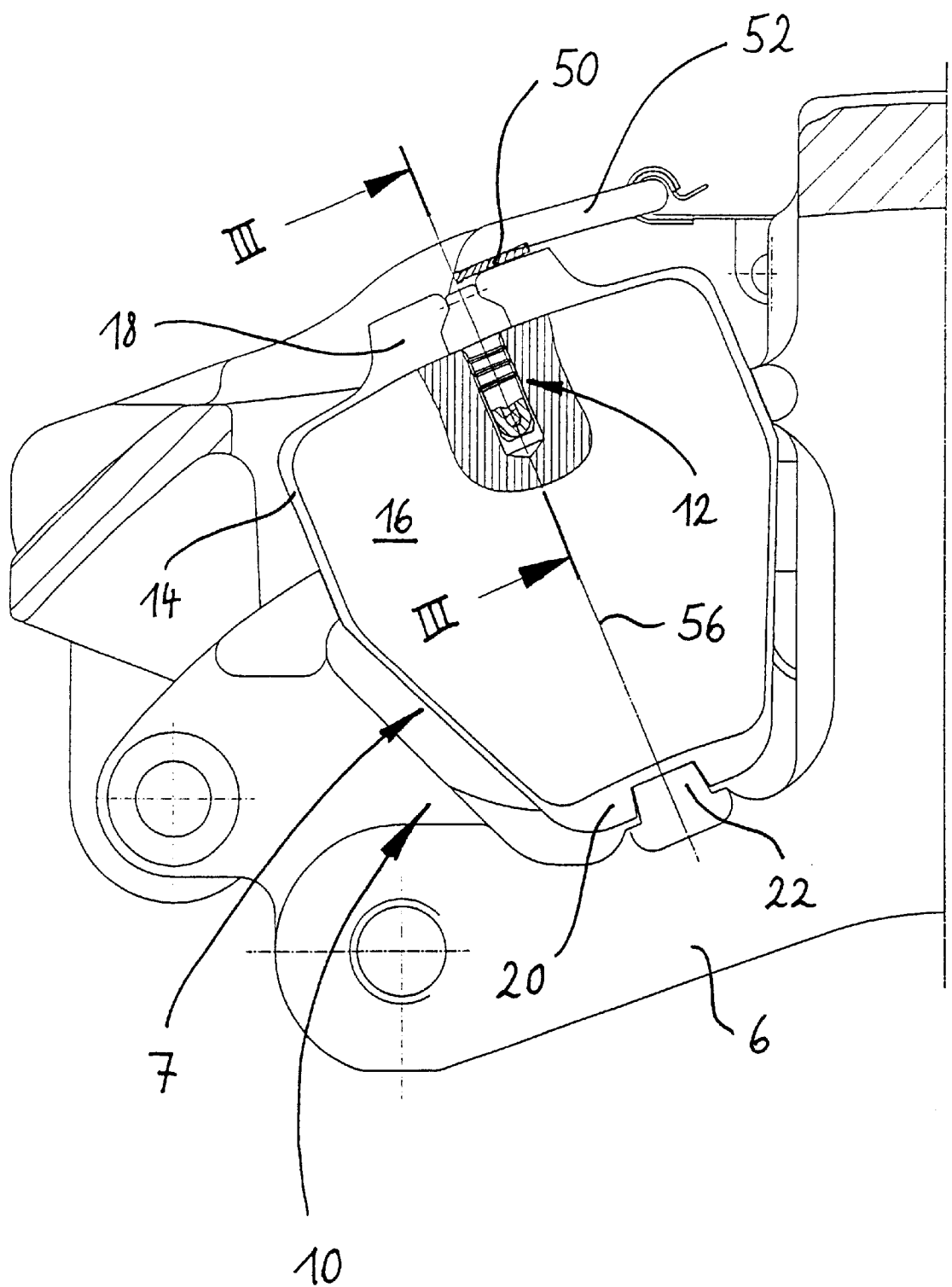

FIG. 2 shows, in the regard, a partially broken-open side view of the one brake lining 7 from FIG. 1. Like all of the other brake linings 7 and 9 the illustrated brake lining 7 comprises a back plate 14, here made of steel, to which a friction lining 16 is fastened, for example by adhesion. A radially outer region 18 of the back plate 14 is not covered by the friction lining 16. The rear of the back plate 14 abuts the associated actuating piston 3 (see FIG. 3), while a guide projection 20 formed radially on the inside of the back plate cooperates with a guide 22 formed on the brake carrier 6 to ensure proper guidance of the brake lining 7.

Figure 3:
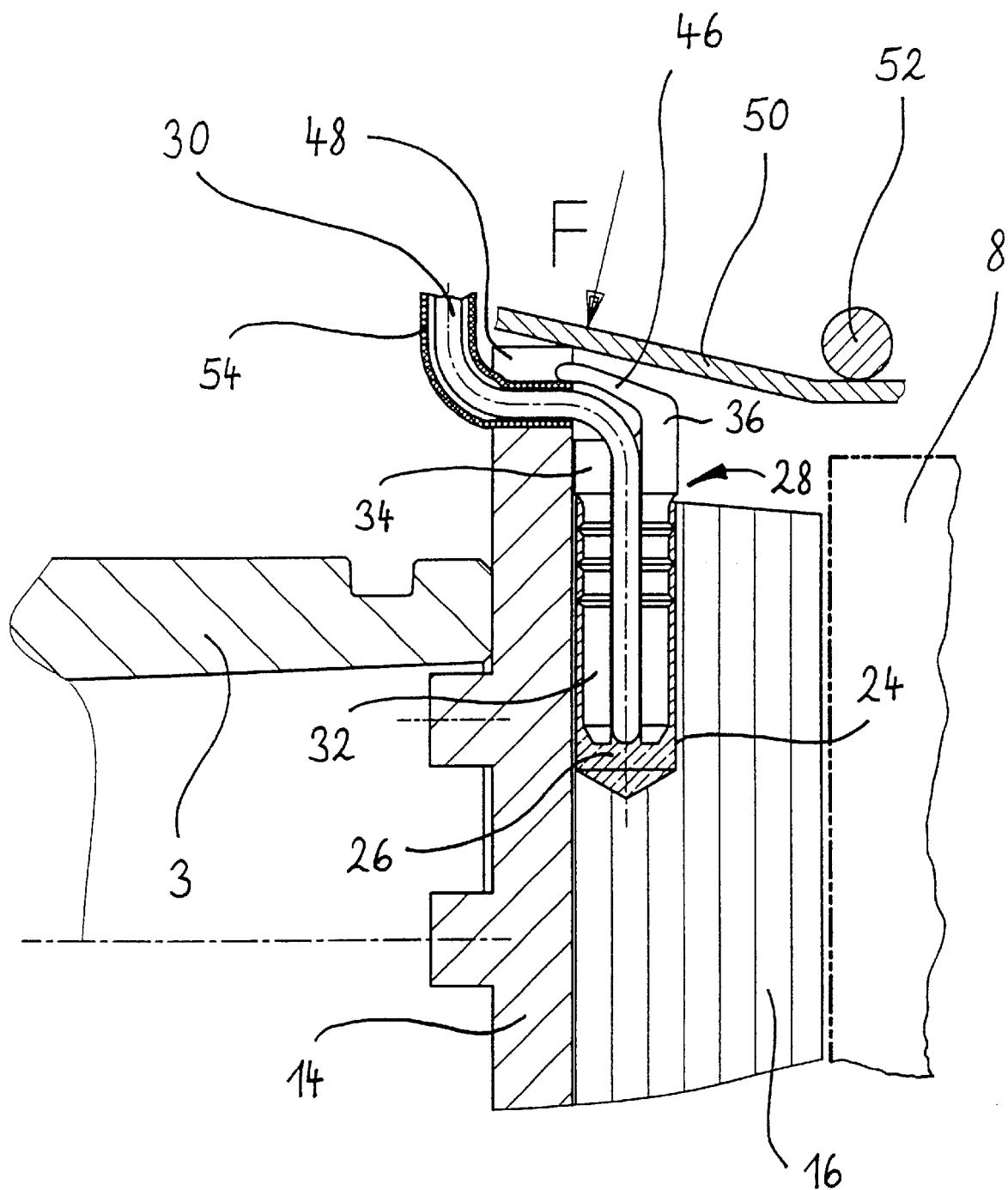

Adjacent to the front of the back plate 14 the warning device 12 is fastened in a radially extending bore 24 of the friction lining 16, for example by adhesion using a synthetic resin 26 (see FIG. 3). The warning device 12 comprises a plug 28, here made of plastics material, and an electric conductor 30 in the form of an insulated litz wire fastened thereto.

The plug 28 has a substantially cylindrical shank 32, a cuboid-shaped head 34 and a protective shield 36 projecting up from the latter. The shank 32, which is inserted in the bore 24, is provided at two opposing sides with a longitudinal groove 38, which is symmetrical to a centre plane 40 of the shank 32 and extends round the bottom end of the shank 32 situated in the bore 24.

The head 34 has two slots 42, which are incorporated from two mutually opposite sides and aligned with the longitudinal grooves 38. The conductor 30 is passed in the centre plane 40 in a U-shape round the shank 32 and inserted in the latter's longitudinal groove 38 as well as into the slots 42 of the head 34.

Formed on the shank 32 is a plurality of ribs 44, which provide clearance around the shank 32 for the synthetic resin 26 and at the same time ensure an even better anchoring of the shank 32 in the cured synthetic resin 26.

As may be seen particularly well from FIGS. 3 and 4B, the protective shield 36, which protects the electric conductor 30 from mechanical damage and also from heat radiated by the brake disk 8, is arranged laterally offset relative to the longitudinal groove 38. From the protective shield 36 an extension 46, which is formed integrally with the protective shield 36, extends with a slight obliquely upward slope beyond the centre plane 40 in the direction of the back plate 14 as far as into a recess 48, which is provided in the back plate 14 and open towards its radially outer edge. By means of the extension 46 the electric conductor 30 accommodated in the longitudinal groove 38 of the plug is forcibly deflected and guided into and through the recess 48. There is therefore no danger of the electric conductor 30 being nipped between a spring arm 50 of a hold-down spring 52 (see also FIG. 1), which presses the brake lining 7 onto its guide 22, and the back plate 14 and therefore possibly suffering damage. By way of additional protection the electric conductor 30 is provided with a sheath 54, which extends as far as into the recess 48.

As may be seen from FIGS. 2 and 3, the bore 24 and the recess 48 in the illustrated embodiment have a common centre plane 56. As a result, the electric conductor 30 is conveyed along the shortest route out of the zone, which is close to the brake disk and therefore hot. The spring arm 50 of the hold-down spring 52 closes the recess 48 in a radially outward direction, thereby preventing detachment of the warning device 12 from the brake lining 7 even in the event that the synthetic resin 26 no longer performs its retaining function, for example because it has decomposed as a result of excessive temperatures.

Figure 5:
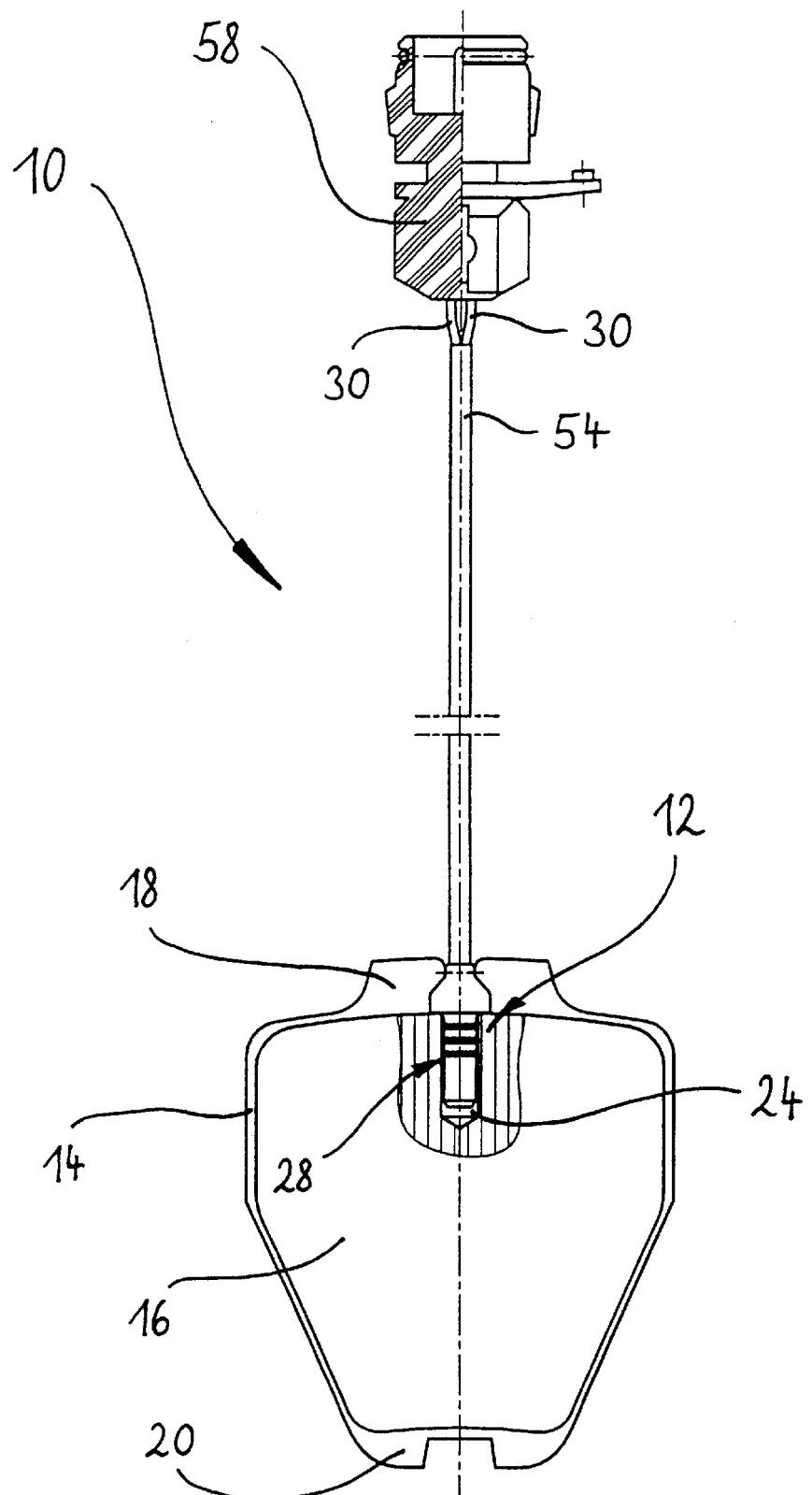

FIG. 5 shows the brake lining module 10 in a state of readiness for connection, with a connector 58. The connector 58 is fastened to the disk brake 1 in a clamping retainer 60 (see FIG. 1).

Figure 6:
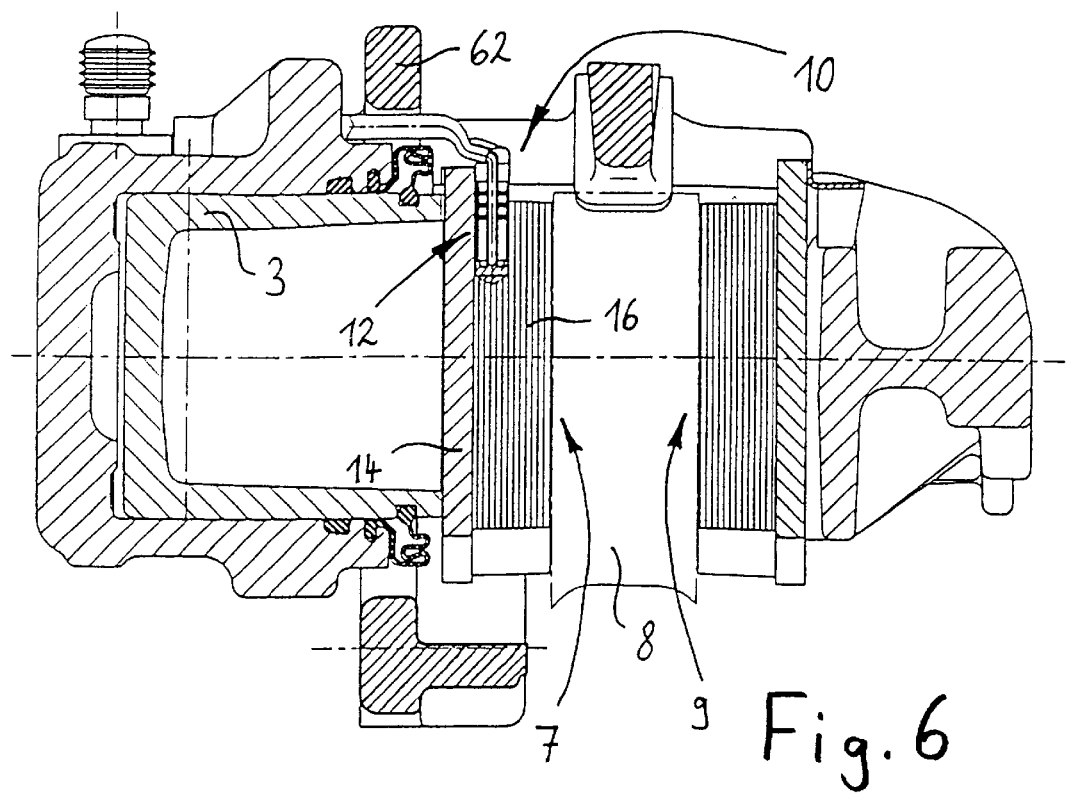

FIG. 6 shows a slightly modified refinement of a brake lining module 10, which is however very similar to the previously described embodiment. Unlike the previously described embodiment, the brake lining 7 shown in FIG. 6 has no recess 48. Instead, the electric conductor 30 is passed underneath a bridge 62, which is part of the brake carrier 6.

Figure 7:
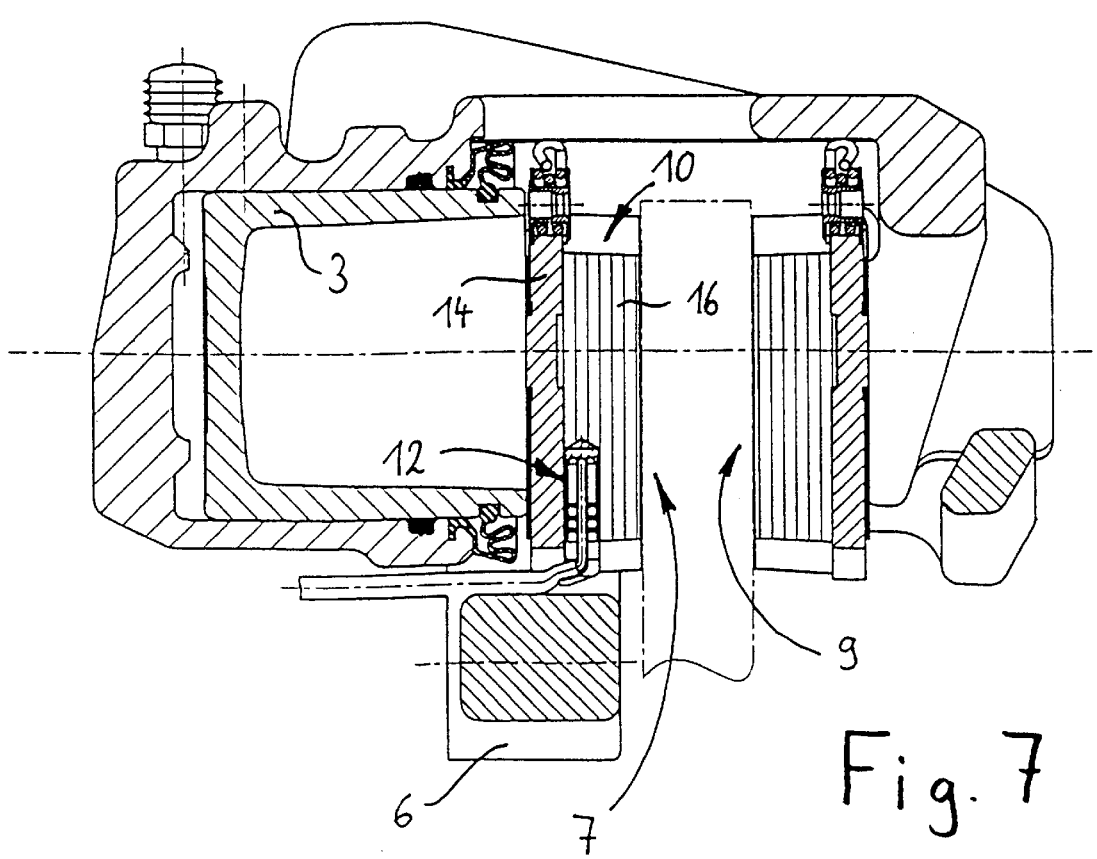

FIG. 7 shows a, once more, modified embodiment of a brake lining module 10, in which unlike in the previous two embodiments the warning device 12 is disposed at the radially inner edge of the brake lining 7. The electric conductor 30 is led away from the brake disk 8 between the back plate 14 and the brake carrier 6.

The last two embodiments demonstrate that a warning device 12 may advantageously be used also in brake linings without a recess 48.

What is claimed is:

1. An electric warning device for indicating excessive friction lining wear comprising:

a plug which includes a head and a shank with a longitudinal groove, in which an electric conductor passed through said head is accommodated; and a protective shield, which projects up from said head of said plug, is laterally offset relative to said longitudinal groove and has an extension, which at a distance above said head protrudes in a direction of a common centre plane of said shank and of said longitudinal groove;

characterized in that said extension extends from said protective shield over said common centre plane of said shank and of said longitudinal groove up to at least approximately an opposite edge of said shank, and that said electrical conductor is disposed beneath said extension and extends in the direction of said extension.

2. The electrical warning device according to claim 1, characterized in that said electric warning device is adapted for use in a brake lining module, said brake lining module including a back plate having a friction lining fastened thereto, said back plate having a radially situated friction lining free region, a bore provided in said friction lining disposed close to said back plate, characterized in that said back plate in said friction lining free region has a recess which is open towards a radial edge of said back plate, fastened in said bore is said electric warning device, said conductor led through said recess, and said recess and said bore having centre planes which are at least adjacent.

3. The electrical warning device according to claim 2, characterized in that said extension of said electric warning device extends as far as into said recess of said back plate.

4. The electrical warning device according to claim 2, characterized in that said electric warning device is for use in a disk brake, said disk brake including a hold down spring having a spring arm, said spring arm acting upon said brake lining module and closing said radial open edge of said recess of said back plate.

5. The electrical warning device according to claim 1, characterized in that said extension extends beyond said head of said shank.

6. The electrical warning device according to claim 1, characterized in that said extension exerts a force acting in the direction of said shank upon said electric conductor.

7. The electrical warning device according to claim 1, characterized in that a connector is fastened to a free end of said electrical conductor.

8. The electrical warning device according to claim 1, characterized in that said electric warning device is for use in a disk brake.

9. An electric warning device for indicating excessive friction lining wear comprising:

a plug which includes a head and a shank with a longitudinal groove, in which an electric conductor passed through said head is accommodated; and a protective shield, which projects up from said head of said plug, is laterally offset relative to said longitudinal groove and has an extension, which at a distance above said head protrudes in a direction of a common centre plane of said shank and of said longitudinal groove;

characterized in that said extension extends from said protective shield over said common centre plane of said shank and of said longitudinal groove toward an opposite edge of said shank, and that said electrical conductor is disposed beneath said extension and extends in the direction of said extension.

10. The electrical warning device according to claim 9, characterized in that said electric warning device is adapted for use in a brake lining module, said brake lining module including a back plate having a friction lining fastened thereto, said back plate having a radially situated friction lining free region, a bore provided in said friction lining disposed close to said back plate, characterized in that said back plate in said friction lining free region has a recess which is open towards a radial edge of said back plate, fastened in said bore is said electric warning device, said conductor led through said recess, and said recess and said bore having centre planes which are at least adjacent.

11. The electrical warning device according to claim 10, characterized in that said extension of said electric warning device extends as far as into said recess of said back plate.

12. The electrical warning device according to claim 10, characterized in that said electric warning device is for use in a disk brake, said disk brake including a hold down spring having a spring arm, said spring arm acting upon said brake lining module and closing said radial open edge of said recess of said back plate.

13. The electrical warning device according to claim 9, characterized in that said extension extends beyond said head of said shank.

14. The electrical warning device according to claim 9, characterized in that said extension exerts a force acting in the direction of said shank upon said electric conductor.

15. The electrical warning device according to claim 9, characterized in that a connector is fastened to a free end of said electrical conductor.

16. The electrical warning device according to claim 9, characterized in that said electric warning device is for use in a disk brake.

* * * * *